United States Patent
Kolls

(10) Patent No.: US 10,692,109 B1
(45) Date of Patent: Jun. 23, 2020

(54) PROVIDING INCENTIVES FOR CONSUMING SPONSORED MEDIA CONTENT

(71) Applicant: Wells Fargo Bank, N.A., San Francisco, CA (US)

(72) Inventor: H. Brock Kolls, Alpharetta, GA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 323 days.

(21) Appl. No.: 15/425,323

(22) Filed: Feb. 6, 2017

(51) Int. Cl.
*G06Q 30/02* (2012.01)
*G06Q 20/10* (2012.01)
*G01C 21/36* (2006.01)

(52) U.S. Cl.
CPC ..... *G06Q 30/0265* (2013.01); *G01C 21/3697* (2013.01); *G06Q 20/102* (2013.01); *G06Q 30/0269* (2013.01); *G06Q 30/0275* (2013.01)

(58) Field of Classification Search
CPC ........... G06Q 30/0251; G06Q 30/0265; G06Q 30/0266; G06Q 30/0269; G06Q 30/0275; G06Q 20/102; G01C 21/3697
USPC .......... 705/14.49, 14.62, 14.63, 14.66, 14.71
See application file for complete search history.

(56) References Cited

U.S. PATENT DOCUMENTS

| | | | |
|---|---|---|---|
| 6,374,228 B1 | 4/2002 | Litwin | |
| 6,606,745 B2 | 8/2003 | Maggio | |
| 6,961,536 B2 | 11/2005 | Himmel et al. | |
| 7,174,154 B2 | 2/2007 | Ehlers | |
| 8,478,209 B2 | 7/2013 | Bai et al. | |
| 8,694,328 B1 | 8/2014 | Goermley | |
| 8,909,476 B2 | 12/2014 | Tuukkanen | |
| 2002/0010621 A1 | 1/2002 | Bell et al. | |
| 2006/0242017 A1* | 10/2006 | Libes | G06F 17/30864 705/14.54 |
| 2007/0226763 A1* | 9/2007 | Hempleman | G06Q 30/02 725/46 |
| 2008/0133311 A1 | 6/2008 | Madriz Ottolina | |
| 2008/0156173 A1 | 7/2008 | Bauer | |
| 2011/0106375 A1 | 5/2011 | Gurusamy Sundaram | |
| 2011/0145048 A1 | 6/2011 | Liu | |
| 2012/0310713 A1 | 12/2012 | Mercuri et al. | |
| 2013/0006775 A1 | 1/2013 | Jordan et al. | |
| 2013/0030645 A1 | 1/2013 | Divine et al. | |
| 2014/0136187 A1 | 5/2014 | Wolverton et al. | |
| 2014/0188920 A1 | 7/2014 | Sharma et al. | |
| 2014/0196072 A1 | 7/2014 | Bagwell | |

(Continued)

OTHER PUBLICATIONS

Sage, Alexandria, of Reuters, Ford expands Alexa use, heating up auto personal assistant battle, downloaded from https://www.reuters.com/article/us-tech-ces-ford/ford-expands-alexa-use-heating-up-auto-personal-assistant-battle-idUSKBN14P0B7, dated Jan. 4, 2017 (Year: 2017).*

(Continued)

*Primary Examiner* — Scott D Gartland
(74) *Attorney, Agent, or Firm* — Merchant & Gould P.C.

(57) ABSTRACT

Systems and methods for negotiating media payments paid to a consumer traveling in a vehicle include delivering sponsored media content to a device in the vehicle. In exchange for listening to the sponsored media content, a media payment is transmitted to a financial account associated with the user. In some embodiments, the media payment is higher when the sponsored media content has more geographic relevance to the consumer's location in the vehicle.

20 Claims, 10 Drawing Sheets

(56) References Cited

U.S. PATENT DOCUMENTS

| | | |
|---|---|---|
| 2015/0053066 A1 | 2/2015 | Hampiholi et al. |
| 2015/0112585 A1 | 4/2015 | Knepper et al. |
| 2015/0185030 A1 | 7/2015 | Monroe et al. |
| 2015/0206181 A1 | 7/2015 | Parundekar et al. |
| 2016/0039426 A1 | 2/2016 | Ricci |
| 2016/0203520 A1 | 7/2016 | Das et al. |

OTHER PUBLICATIONS

Montague, Eric, Tiro is history: Welcome to the new era of the automotive assistant for the connected car, http://whatsnext.nuance.com/connected-living/driving-with-automotive-assistant-for-connected-cars/, dated Jan. 5, 2016 (Year: 2016).*

Colao, J. J., Watch Ads, Get Paid: Is This the Future of Ad-Supported Content?, Forbes.com, downloaded Dec. 17, 2018 from https://www.forbes.com/sites/jjcolao/2013/03/01/watch-ads-get-paid-is-this-the-future-of-ad-supported-content/#2a46cab05a77, dated Mar. 1, 2013 (Year: 2013).*

Broida, Rick, HitBliss app rewards you for watching commercials, cnet.com, downloaded from https://www.cnet.com/news/hitbliss-app-rewards-you-for-watching-commercials/, dated Apr. 21, 2014 (Year: 2014).*

Montague, "Tiro is history: welcome to the new era of the automotive assistant for the connected car," Jan. 5, 2016, http://whatsnext.nuance.com/connected-living/driving-with-automotive-assistant-for-connected-cars/, 6 pages.

Macario et al., "An in-vehicle infotainment software architecture based on Google Android," Aug. 7, 2009, http://ieeexplore.ieee.org/document/5196223/?reload=true, 5 pages.

Tully, Jim et al., "Internet of Things Primer for 2016," Mar. 31, 2016, 8 pages.

Velosa, Alfonso, et al., "Hype Cycle for the Internet of Things, 2016," Jul. 14, 2016, 68 pages.

Velosa, Alfonso et al., "Maturity Model for the Internet of Things," Mar. 2, 2016, 18 pages.

Tully, Jim, "IoT: Key Lessons to Date and Action Plan for 2016," Feb. 12, 2016, 8 pages.

Prentice, Stephen, "The Six Forces That Will Shape Business and Technology in 2030," Feb. 1, 2016, 9 pages.

Friedman, Ted et al., "Predicts 2016: Unexpected Implications Arising From the Internet of Things," Dec. 3, 2015, 13 pages.

Cearley, David W. et al., "Top 10 Strategic Technology Trends for 2016," Feb. 29, 2016, 15 pages.

Burke, Brian et al., "Top 10 Strategic Technology Trends for 2016: Internet of Things Architecture and Platforms," Feb. 19, 2016, 11 pages.

Cearley, David W. et al, "Top 10 Strategic Technology Trends for 2016: Ambient User Experience," Feb. 26, 2016, 11 pages.

Walker, Mike J. et al., "Top 10 Strategic Technology Trends for 2016: Information of Everything," Feb. 26, 2016, 11 pages.

Plummer, Daryl C. et al., "Top Strategic Predictions for 2016 and Beyond: The Future Is a Digital Thing," Oct. 2, 2015, 27 pages.

Jones, Nick, "Top 10 IoT Technologies for 2017 and 2018," Jan. 22, 2016, 12 pages.

Geschickter, Chet et al., "Measuring the Strategic Value of the Internet of Things for Industries," Apr. 28, 2016, 14 pages.

Furlonger, David et al., "Toolkit: IoT Strategic Technology Map for Financial Services Initiatives," Dec. 2, 2015, 4 pages.

Furlonger, David et al., "Survey Analysis: Financial Services CIOs Should Not Ignore the Internet of Things," Mar. 17, 2015, 17 pages.

Moyer, Kristin R. et al., "Measuring the Strategic Value of Financial Services IoT," Dec. 2, 2015, 10 pages.

Newton, Alistair et al., "Gartner's Digital Banking Customer Advisory Framework," Jul. 7, 2016, 8 pages.

Moyer, Kristin R., "Industry Vision: Banks as Platforms," Apr. 22, 2016, 11 pages.

Moyer, Kristin R. et al., "Industry Vision: Tipping Point for Banks as Platforms," May 3, 2016, 11 pages.

Moyer, Kristin R., "The Economics of Connections for Banking," Mar. 8, 2016, 12 pages.

Geschickter, Chet et al., "Survey Analysis: Early Adopters of Internet of Things Poised to Make 2016 the Year of the Customer," Feb. 12, 2016, 15 pages.

Lehong, Hung et al., "Building a Digital Business Technology Platform," Jun. 8, 2016, 21 pages.

* cited by examiner

PROVIDING INCENTIVES FOR CONSUMING SPONSORED MEDIA CONTENT

BACKGROUND

People listen to various types of media content while traveling in vehicles. Historically, one of the main sources of media entertainment in a vehicle was a radio. Radio stations would include advertisements to support the cost of providing entertainment to listeners. New media playback technologies allow for listeners to hear entertainment media content for free if the listener also listens to advertisements. Some services provide advertisement-free media entertainment if the listener pays a fee.

SUMMARY

A method of negotiating a media payment paid to a consumer traveling in a vehicle comprises: receiving a playlist selection from the consumer traveling in the vehicle; determining one or more preferences of the consumer; receiving a location of the vehicle; determining one or more advertisements relevant to the consumer based on the location of the vehicle and the preferences of the consumer; determining one or more entertainment content items that are aligned with the preferences of the consumer; building a playlist including the one or more advertisements and one or more entertainment content items that conform to the playlist selection; determining a compensation amount to be paid to the consumer in the media payment based on one or more of: an amount of advertisements included in the playlist, and a level of regional relevance of the advertisements to the consumer's location; playing the playlist in the vehicle; and transmitting the media payment to the consumer.

One or more computer-readable media have computer-executable instructions embodied thereon that, when executed by a digital device, cause the digital device to: receive at a virtual personal assistant, preferences of a consumer traveling in a vehicle; receive at the virtual personal assistant, a playlist type selection from the consumer; receive at a media consumption payment negotiation engine, a location and route of the vehicle; determine by the media consumption payment negotiation engine, a plurality of advertisements relevant to the consumer based on the location and route of the vehicle and the preferences of the consumer; receive bids at a financial transaction processor, from one or more advertisers for placing the plurality of advertisements in a playlist based on geographic relevance; determine by the financial transaction processor, a media payment amount to be paid to the consumer from an advertiser for listening to each of the plurality of advertisements; determine by the media consumption payment negotiation engine, a plurality of entertainment content items that align with the preferences of the consumer; build by a media playback application, the playlist comprising at least one advertisement and at least one entertainment content item that conform with the playlist type selection; play the playlist in the vehicle through a device output; and submit a media payment to the consumer through the financial transaction processor.

A system for building customized playlists and rewarding consumers for listening to advertisements comprises: a remote server comprising: a virtual personal assistant processor; a financial transaction processor for determining payments to be sent to a consumer based on advertisements the consumer has listened to, wherein the payments are determined by a route rate, a local rate, or a regional rate depending on the consumer's location and route; and a media delivery engine for accessing advertisement media content and entertainment media content and communicating the content to a virtual personal assistant.

The details of one or more embodiments are set forth in the accompanying drawings and the description below. Other features, objects, and advantages of these embodiments will be apparent from the description, drawings, and claims.

DETAILED DESCRIPTION

The present disclosure is directed to systems and methods for negotiating incentives for a consumer traveling in a vehicle. Sponsored media content is delivered to a device in the vehicle in which the consumer is traveling. In exchange for listening to the sponsored media content, a media payment is transmitted to a financial account associated with the user (or other compensation is provided). In some embodiments, the media payment is higher when the sponsored media content has more geographic relevance to the consumer.

Figure 1:
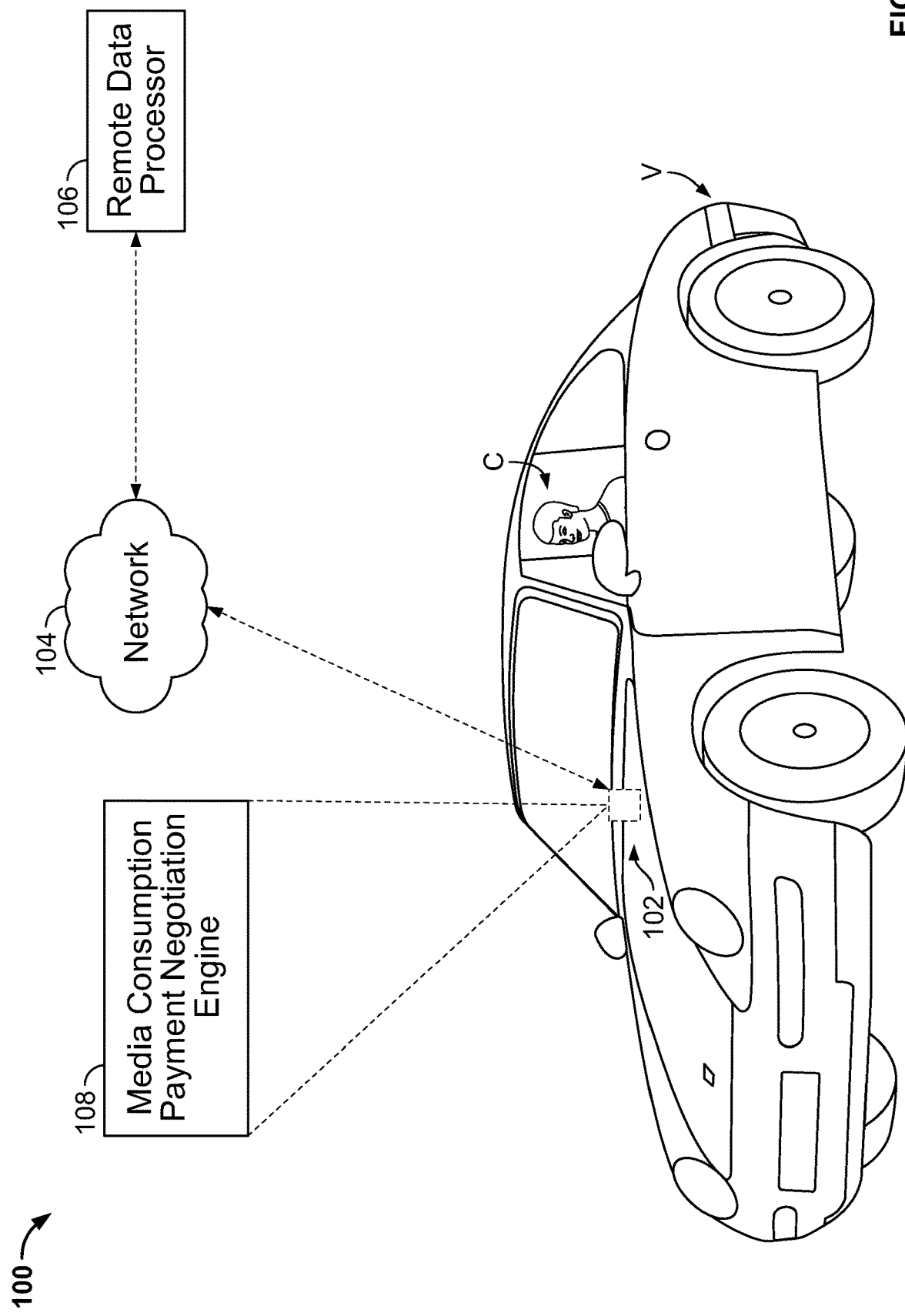
FIG. 1 illustrates an example system for incentivizing a consumer traveling in a vehicle for listening to sponsored media content.

FIG. 1 shows an example system 100 for paying a consumer C traveling in a vehicle V for listening to sponsored media content. The vehicle V includes a digital device 102 which communicates through a network 104 with a remote data processor 106. The consumer C may be driving the vehicle V or may be a passenger. In yet another example, the vehicle V can be an autonomous vehicle that controls part or all of the driving functions.

The digital device 102 may be integrated into the vehicle V or may be a separate device. In some embodiments, the digital device 102 is a mobile device such as a smart phone or tablet. The digital device 102 includes a media consumption payment negotiation engine 108 which operates to negotiate media payments to the consumer C traveling in the vehicle V. In other examples, the digital device 102 can be computing device that is coupled to or otherwise integrated into the vehicle V, such as a radio or other interactive device including a user interface.

Figure 2:
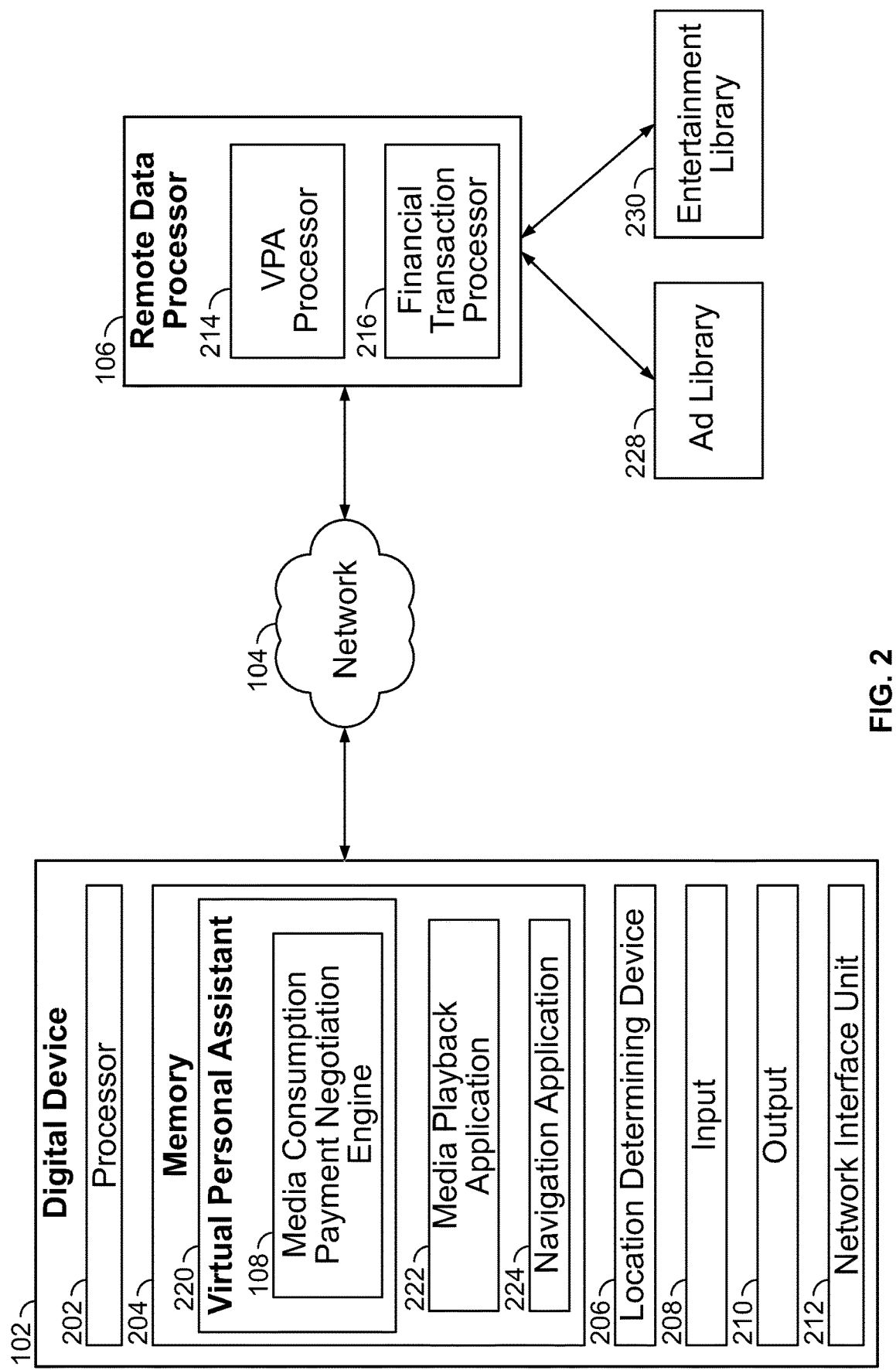
FIG. 2 is a schematic illustration of the example system of FIG. 1.

FIG. 2 shows a more detailed schematic view of the digital device 102 and the remote data processor 106 of FIG.

1. Example modules within the digital device 102 include a processor 202, memory 204, a location determining device 206, input 208 output 210, and a network interface unit 212. The digital device 102 communicates through the network 104 with the remote data processor 106. In some embodiments, the remote data processor 106 includes a VPA processor 214 and a financial transaction processor 216.

The processor 202 in the digital device 102 has wireless capability for communicating through the network 104. The wireless capability may include Bluetooth, radio frequency identification (RFID), or similar types of wireless capability. The processor 202 also functions to execute instructions stored in the memory 204.

The memory 204 includes software applications that are installed on the digital device 102. The memory 204 can include one or more of random access memory ("RAM"), read-only memory ("ROM"), and a mass storage device for storing software instructions and data. In some embodiments, the memory 204 includes a virtual personal assistant 220, a media playback application 222, and a navigation application 224.

The memory 204 includes computer-readable data storage media. Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the digital device 102.

The virtual personal assistant 220 interacts with a consumer traveling in a vehicle. In some embodiments, the virtual personal assistant 220 receives input from the consumer through the device input 208 which selects a playlist of media content to play through the device output 210. In some embodiments, the consumer's preferred playlist selection is saved for future uses. The playlist type selection received from a consumer defines the media payment rate and the ratio of advertisements to entertainment in the playlist. Greater amounts of advertisements result in higher media payment rates. Playlist types are further described with respect to FIG. 7.

The virtual personal assistant 220 may also operate to determine one or more preferences of the consumer by prompting the user for feedback or receiving selections from the consumer. In some embodiments, the consumer may "like" or "dislike" media content, which the virtual personal assistant 220 records to further refine the consumer's preferences. Consumer preferences include one or more of preferred genres of music, preferred genres of audiobooks, preferred genres of podcasts, preferred musical artists, preferred audiobook authors, preferred types of entertainment content, preferred types of advertisements, and preferred advertisement content.

The virtual personal assistant 220 includes a media consumption payment negotiation engine 108. The media consumption payment negotiation engine 108 operates to select advertisements and entertainment content items to include in playlists that are played to the consumer.

In some embodiments, the media consumption payment negotiation engine 108 operates in conjunction with the navigation application 224 to determine which advertisements are relevant to the consumer's location. The media consumption payment negotiation engine 108 receives the consumer's location and/or route from the navigation application 224, which works in conjunction with the location determining device 206, to determine which advertisements have geographic relevance to the consumer. The media consumption payment negotiation engine 108 also considers the consumer's preferences when selecting the advertisements to include in the playlist.

In some embodiments, the media consumption payment negotiation engine 108 takes into account the media payment amount of each advertisement. In some embodiments, the highest paying advertisements are selected to be included in the playlist.

The media playback application 222 operates to receive advertisement and entertainment media content from the media consumption payment negotiation engine 108. The media playback application 222 builds and plays playlists including the advertisement and entertainment media content selected by the media consumption payment negotiation engine 108. The media content is then played through the output 210 of the digital device 102.

The navigation application 224 operates to determine a location of the digital device 102 by communicating with the location determining device 206. In some embodiments, the navigation application 224 determines a route to a destination input by the consumer. In such embodiments, the navigation application 224 guides the consumer to the destination with step-by-step directions. The navigation application 224 can also re-route the consumer in the event of traffic, adding additional stops, or finding a route with higher media payment rates.

The location determining device 206 may operate using GPS and communicate with satellites to determine a location of the digital device 102. The location determining device 206 reports the location of the consumer to the navigation application 224, and ultimately the media consumption payment negotiation engine 108. The location of the digital device 102 is important for determining the geographical relevance of advertisements.

The input 208 receives selections from the consumer. Selections may be made through one or more controls on the digital device 102, a touch-screen interface, by voice command, or through controls in the vehicle, such as steering-wheel mounted controls.

The output 210 operates to emit media content. The media content may be audio, video, or a combination thereof. Preferably, the media content is audio. In some embodiments, audio content is emitted through one or more speakers. The speakers may be housed within the digital device 102 or the digital device 102 may transmit the audio content to one or more external speakers. In some embodiments, the external speakers are part of a vehicle media system. In some embodiments, video content is displayed on a visual display. The visual display may be housed within the digital device 102 or may be external to the digital device 102. The output 210 may also provide verbal output to the consumer to prompt the consumer or to provide guidance to the consumer.

The network interface unit 212 operates to connect the digital device 102 to the remote data processor 106 through the network 104, such as a wireless network, the Internet, or another type of network. It should be appreciated that the network interface unit 212 may also be utilized to connect to other types of networks and remote computing systems.

The remote data processor 106 communicates with one or more ad libraries 228 and entertainment libraries 230. The ad library 228 stores a plurality of advertisements that may be transmitted to the virtual personal assistant 220 to be played for the consumer. Advertisements include one or more of commercials, sponsored songs, sponsored book excerpts, sponsored videos, and other promotional media. The entertainment library 230 stores a plurality of entertainment media content items that may be transmitted to the virtual personal assistant 220 to be played for the consumer. Entertainment content items include one or more of music, podcasts, audiobooks, and other entertainment.

The VPA processor 214 operates to communicate between the virtual personal assistant (VPA) 220 and the remote data processor 106. The VPA processor 214 accesses advertisements from the ad library 228 and entertainment media content items from the entertainment library 230 and delivers them to the VPA 220. The VPA processor 214 communicates with the media consumption payment negotiation engine 108 to determine which advertisements and entertainment media content items to access and deliver to the VPA 220.

The financial transaction processor 216 operates to determine media payment amounts that are paid to the consumer from the advertisers. The financial transaction processor 216 receives bids from advertisers for placing advertisements in a consumer's playlist based on geographic relevance. Advertisers can outbid other advertisements that could be selected for a consumer's playlist by offering higher media payments to the consumer. For example, a first advertiser could determine that a second advertiser is offering a higher media payment rate for a particular local area for listening to its advertisement. The first advertiser could offer a higher media payment than the second advertiser to ensure that the first advertiser's advertisement is played more frequently than the second advertiser's advertisement in that local area. This bidding could occur in real time up to the point that an advertisement is chosen and played for a consumer. Alternatively, bidding could determine media payment amounts for a particular geographic area in advance of advertisements being incorporated into playlists for a particular time period (e.g. for the day).

The financial transaction processor 216 determines the amount of media payments to be paid to the consumer for listening to the playlist. Each advertisement may have a small media payment, such as a cent or a fraction of a cent. The media payment rate is determined by geographic relevance to the consumer. Advertisers generally pay the least for advertisements that have less geographic relevance to the consumer, and pay the most for advertisements that have the most geographic relevance to the consumer. Advertisements may be categorized by a regional rate paying the least to the consumer, a local rate paying a moderate amount to the consumer, and a route rate paying the most to the consumer. Advertisement rates are further described with respect to FIG. 9. Additionally, as was discussed above, bidding between competing advertisers may raise the media payment rate for the consumer. The financial transaction processor 216 also determines the number of advertisements that the consumer is listening to based on the playlist selection. Once a consumer has listened to a playlist including advertisements, the financial transaction processor 216 deposits the negotiated media payments to an online account associated with the consumer. In some embodiments, the media payments are deposited upon accumulating a particular amount, such as a dollar, or upon completing a trip in a vehicle.

In embodiments where the consumer pays to listen to one or more entertainment media content items, the financial transaction processor 216 determines the price of a fee that the consumer pays to consume the entertainment media content. The financial transaction processor 216 can also access the consumer's online account to deduct the fee from the balance of the consumer's online account.

Figure 3:
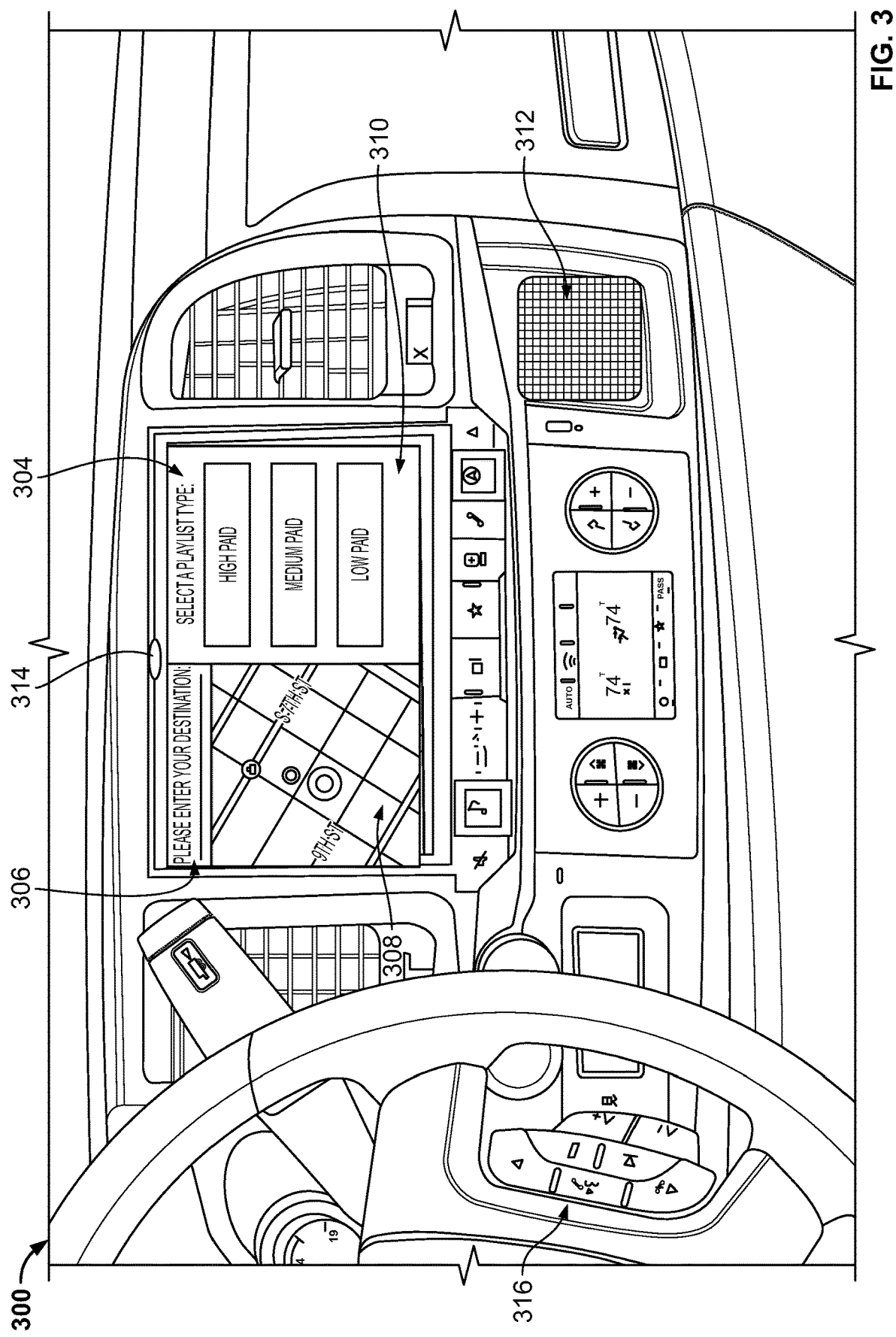
FIG. 3 illustrates an exemplary user interface display within a vehicle.

FIG. 3 illustrates an example embodiment of the digital device 102 in a vehicle interior 300, where the digital device is a vehicle media system 302. The vehicle media system 302 operates the VPA (not shown) to produce a user interface display 304. In some embodiments, the consumer can interact with the user interface display 304 through a touch screen to make selections. A virtual keyboard may be displayed for the consumer to input text entries. In other embodiments, the consumer uses voice commands to provide input and selections. A microphone 314 receives the voice input and the speakers 312 provide audible feedback to the user. Selections may also be made using one or more steering wheel controls 316 or dashboard controls 318 directly on the vehicle media system 302.

In the view of FIG. 3, the user interface display 304 shows a destination entry field 306, a map 308, and a playlist selector 310. In some embodiments, the consumer can enter a destination to which the consumer wishes to travel. The map 308 displays the consumer's current location. At the playlist selector 310, the consumer selects a playlist type to play while traveling. The playlist type determines the amount of advertisements and amount of entertainment media content to include in the playlist. The high paid playlist includes more advertisements than entertainment and pays the greatest amount to the consumer in a media payment. The medium paid playlist includes a balanced mixture of advertisements and entertainment content. The medium paid playlist pays a moderate amount to the consumer. The low paid playlist includes fewer advertisements than entertainment and pays the least amount to the consumer in a media payment. Playlist types are further described with respect to FIG. 7.

Figure 4:
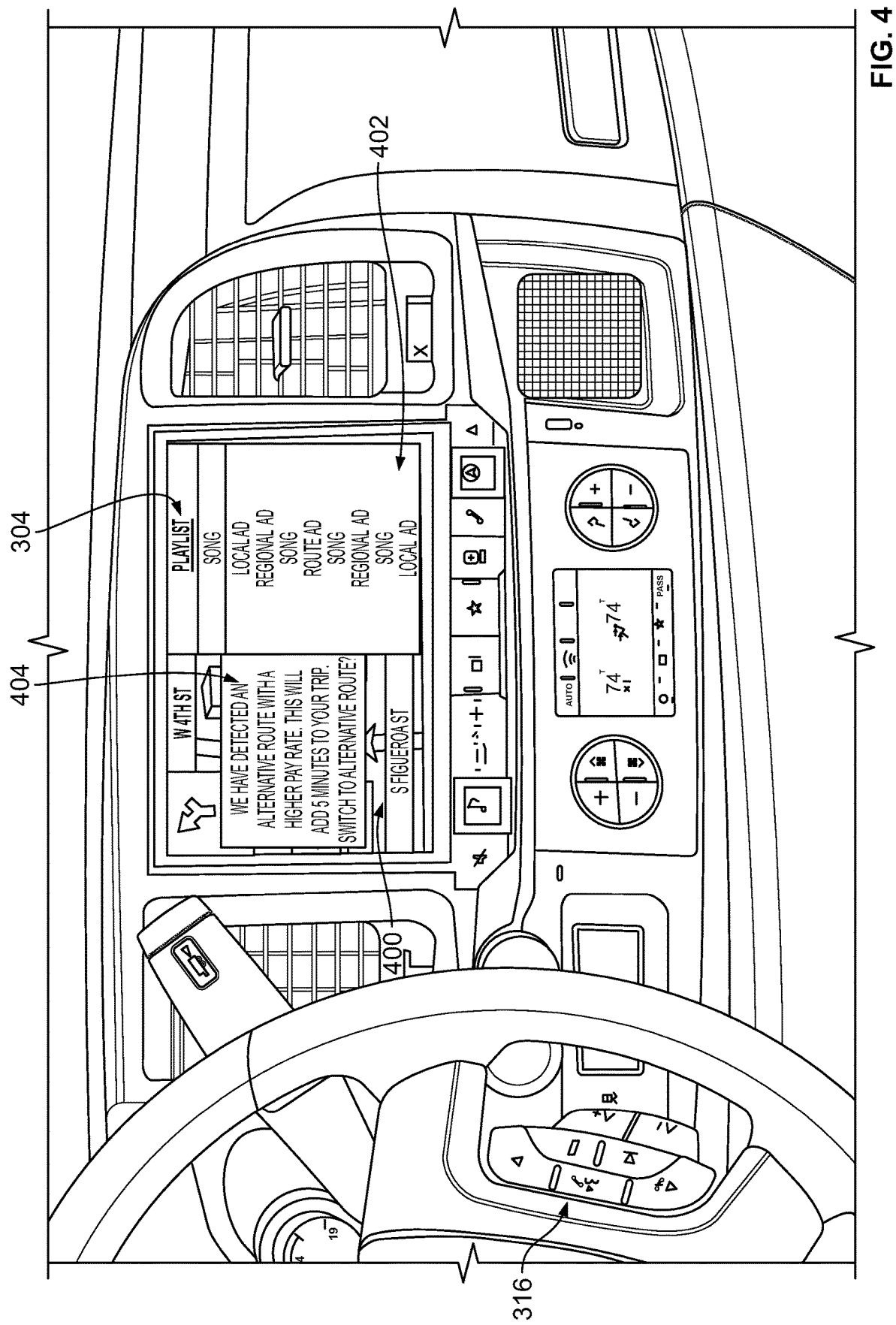
FIG. 4 illustrates another exemplary user interface display in a vehicle.

FIG. 4 shows another view of the user interface display 304 in a vehicle. Here, the consumer has already selected a destination and the navigation application (not shown) is displaying directions in a navigation display 400. The playlist display 402 shows upcoming advertisement and entertainment media content that is going to be played for the consumer. A song is currently playing. At this point during the route, the media consumption payment negotiation engine 108 has determined that the consumer could earn more in media payments by altering the route to the consumer's chosen destination. A message 404 is displayed and/or announced to the consumer suggesting an alternative route ("We have detected an alternative route with a higher pay rate. This will add 5 minutes to your trip. Switch to alternative route?"). The consumer may respond with a verbal command, using steering wheel controls, or making a selection on a touch screen.

The media consumption payment negotiation engine 108 may suggest an alternative route when higher paying ads would become available if the consumer took a short detour. For example, a large number of advertisers may be geographically associated with a shopping mall that is close by the consumer's current route. The advertisements may be in the local area of the consumer, but not within the route area. By taking a slight detour, the consumer could drive by the shopping mall, thereby traveling within the route area of those advertisers. As a result, the media payments for those advertisements increase and the consumer earns a greater media payment while traveling.

Figure 5:
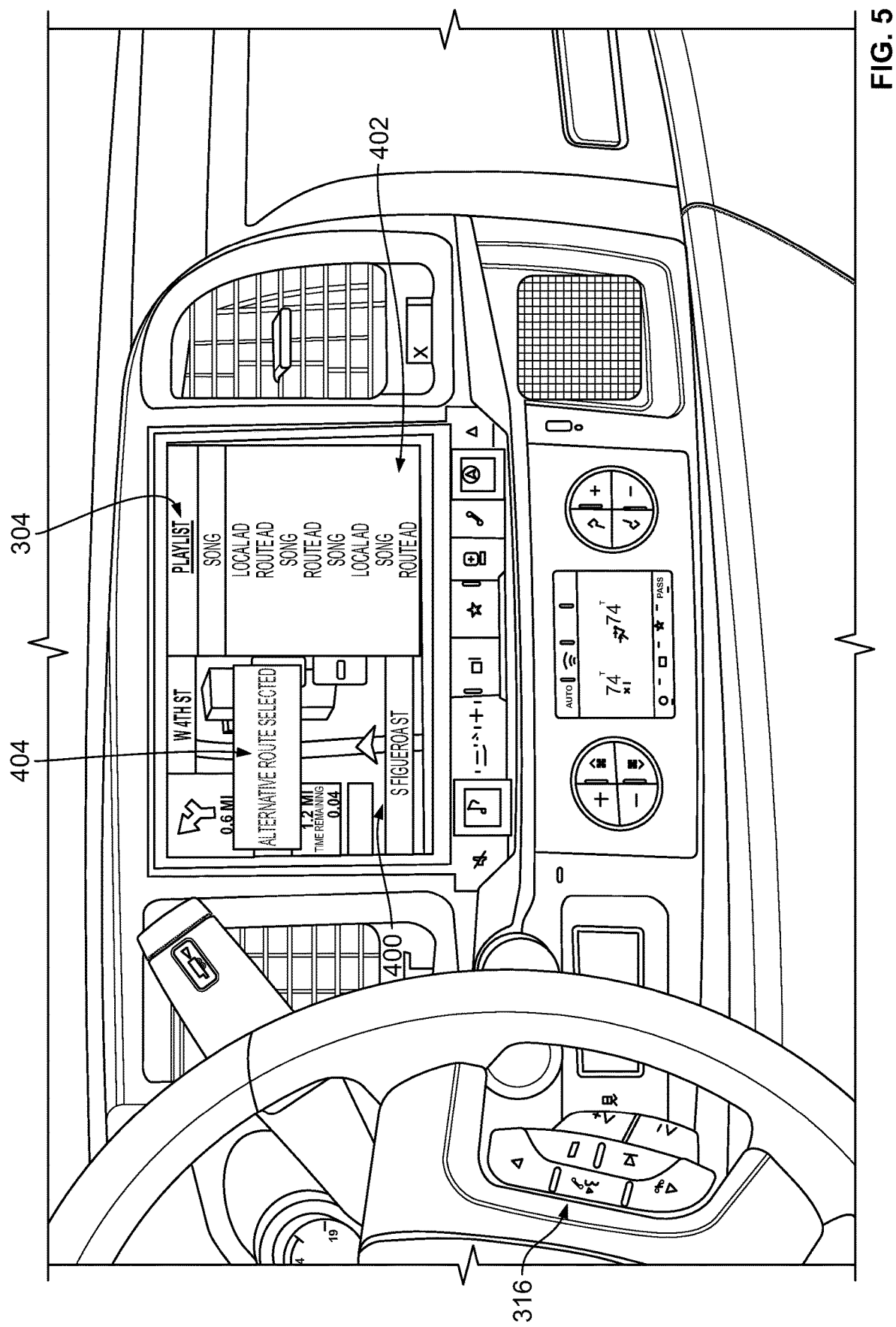
FIG. 5 illustrates another exemplary user interface display in a vehicle.

FIG. 5 shows another view of the user interface display 304 that may be shown if the consumer selects the alternative route suggested in FIG. 4. A message 404 is displayed on the navigation display 400 indicating that the alternative route has been selected. The playlist display 402 shows an updated playlist of ads and entertainment. The selected advertisements have been replaced with more geographically relevant ads. For example, regional ads are replaced with local or route ads. Local ads are replaced with route ads. The changes to the playlist will differ depending on the route and the advertisement content available at the time.

Figure 6:
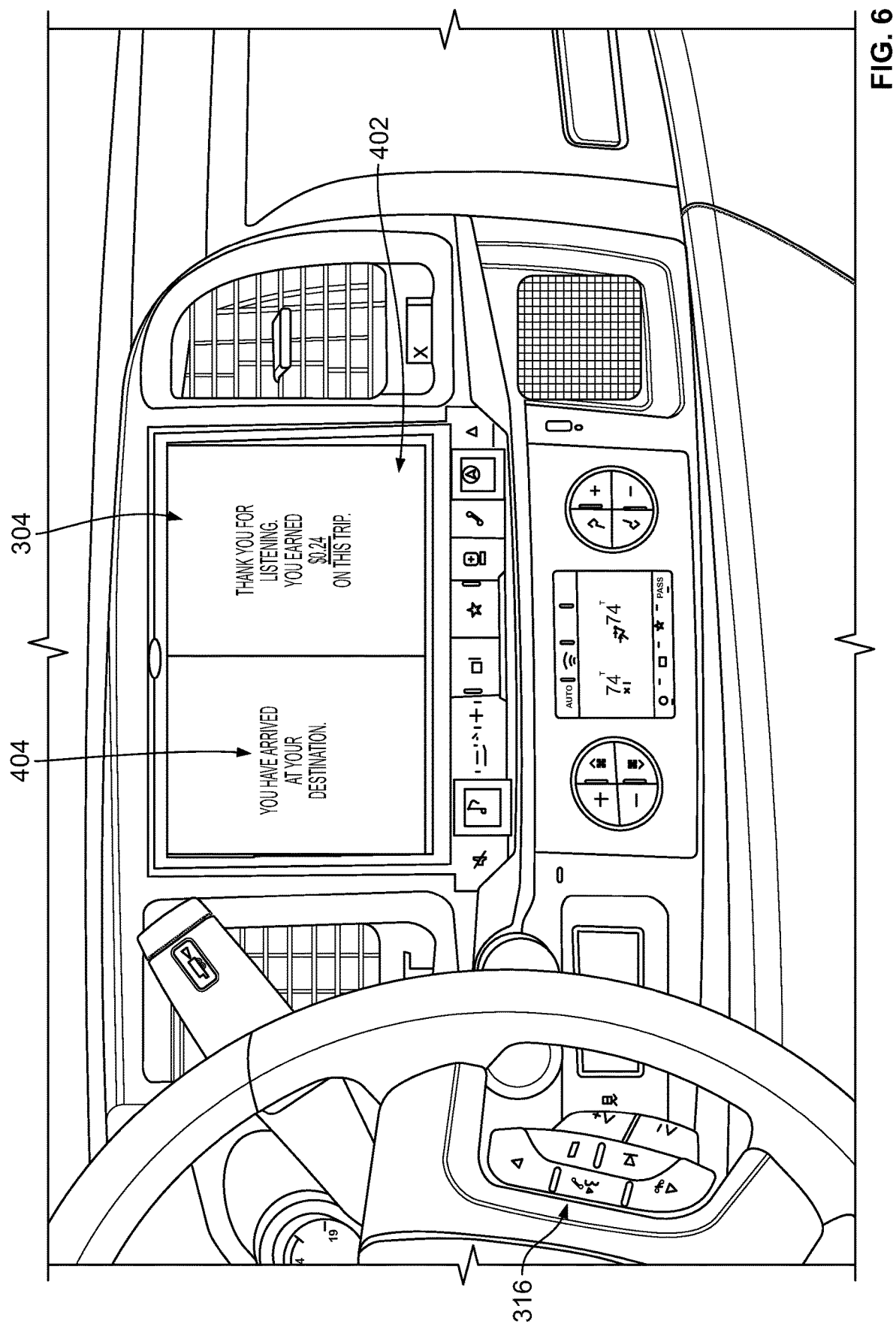
FIG. 6 illustrates another exemplary user interface display in a vehicle.

FIG. 6 shows a view of the user interface display 304 that is shown when the consumer has arrived at the selected destination. The navigation display 400 indicates that the consumer has arrived ("You have arrived at your destination."). The playlist display 402 now indicates the amount the consumer has earned in media payments ("Thank you for listening. You earned $0.24 on this trip."). The media payments will automatically be transferred to the consumer's online account.

Figure 7:
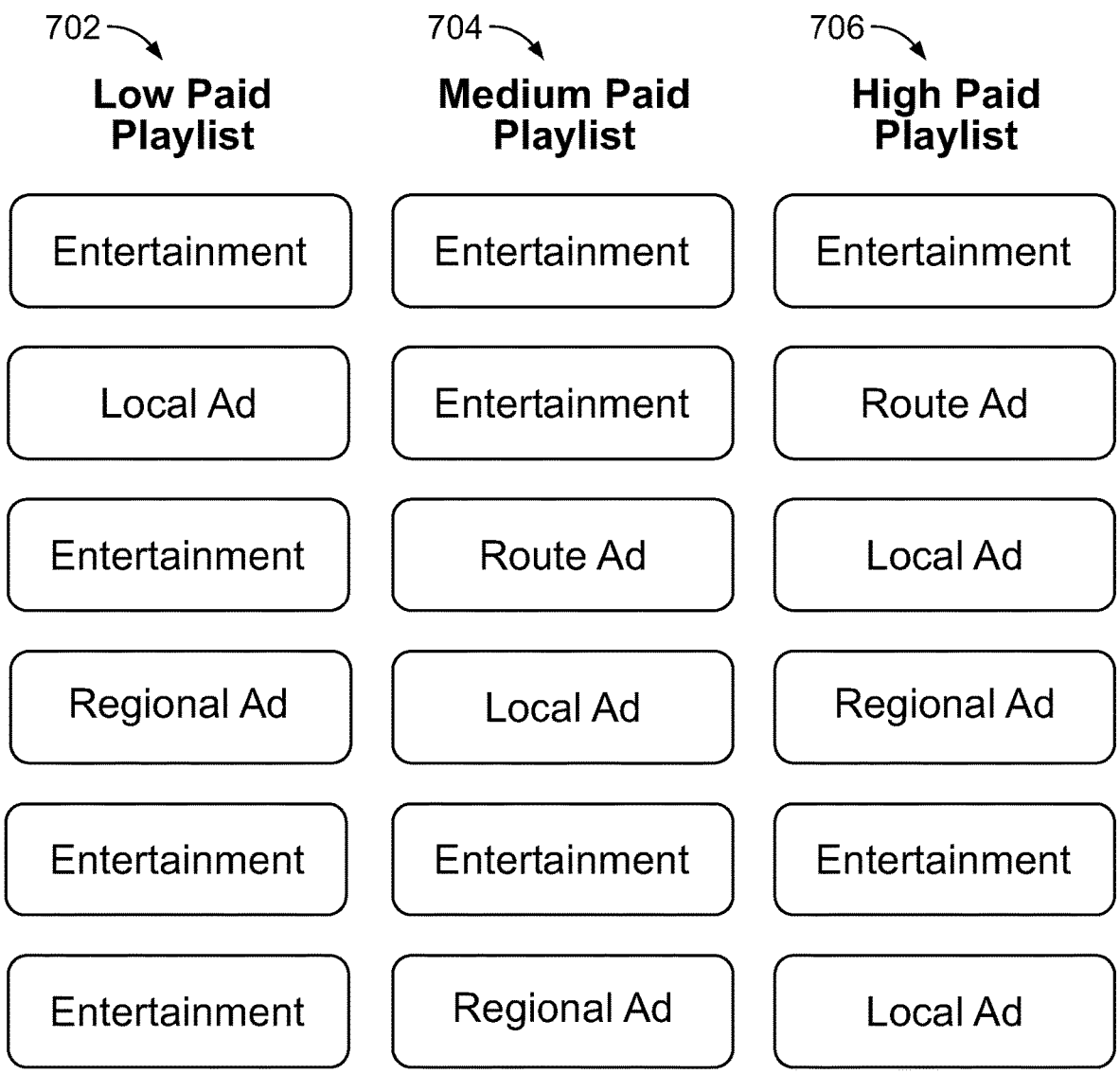
FIG. 7 illustrates a schematic diagram of example playlists generated by the example system of FIG. 1.

FIG. 7 illustrates a schematic diagram of example playlists generated by the example system of FIG. 1. As was described above with respect to FIG. 2, the media consumption payment negotiation engine 108 determines one or more advertisements and entertainment media content items that will be included in a playlist for a particular consumer. The media playback application 222 then builds a playlist from the provided advertisements and entertainment media content items and plays the playlist for the consumer.

The media consumption payment negotiation engine 108 selects advertisements based on the consumer's location. As is described further with respect to FIG. 9, advertisements may have different rates depending on the level of geographic relevance that the advertisement has to the consumer's location. Advertisements include sponsored media content for which the consumer is paid to listen.

The media consumption payment negotiation engine 108 also selects entertainment media content items to include in the playlists based upon the consumer's preferences. Entertainment media content items include non-sponsored media content for which the consumer is not paid to listen. The entertainment content may include music, podcasts, audiobooks, videos, and games. In some embodiments, the consumer's previous listening behavior is analyzed to determine appropriate media content to include in a consumer's playlists. In some embodiments, preferences are determined by consumer input or feedback. In other embodiments, the consumer selects desired entertainment media content to include in a playlist. For example, the consumer may select a particular album to listen to, and songs from that album will be included in a playlist along with selected advertisements. In another example, the consumer may pay to listen to an audiobook and segments of the audiobook will be included in a playlist, interspersed with advertisements.

The playlists are built by the media playback application 222 and can include varying ratios of advertisements and entertainment media content. In the examples of FIG. 7, there is a low paid playlist 702, a medium paid playlist 704, and a high paid playlist 706. Here, the low paid playlist 702 includes two advertisements and four entertainment media content items. This playlist pays the least to the consumer because the consumer is mostly listening to entertainment content. The medium paid playlist 704 includes three advertisements and three entertainment media content items. This playlist pays a moderate amount because the consumer is listening to a balanced amount of advertisements and entertainment content. The high paid playlist 706 include four advertisements and two entertainment media content items. This playlist pays the most to the consumer because the consumer is mostly listening to advertisements.

Figure 8:
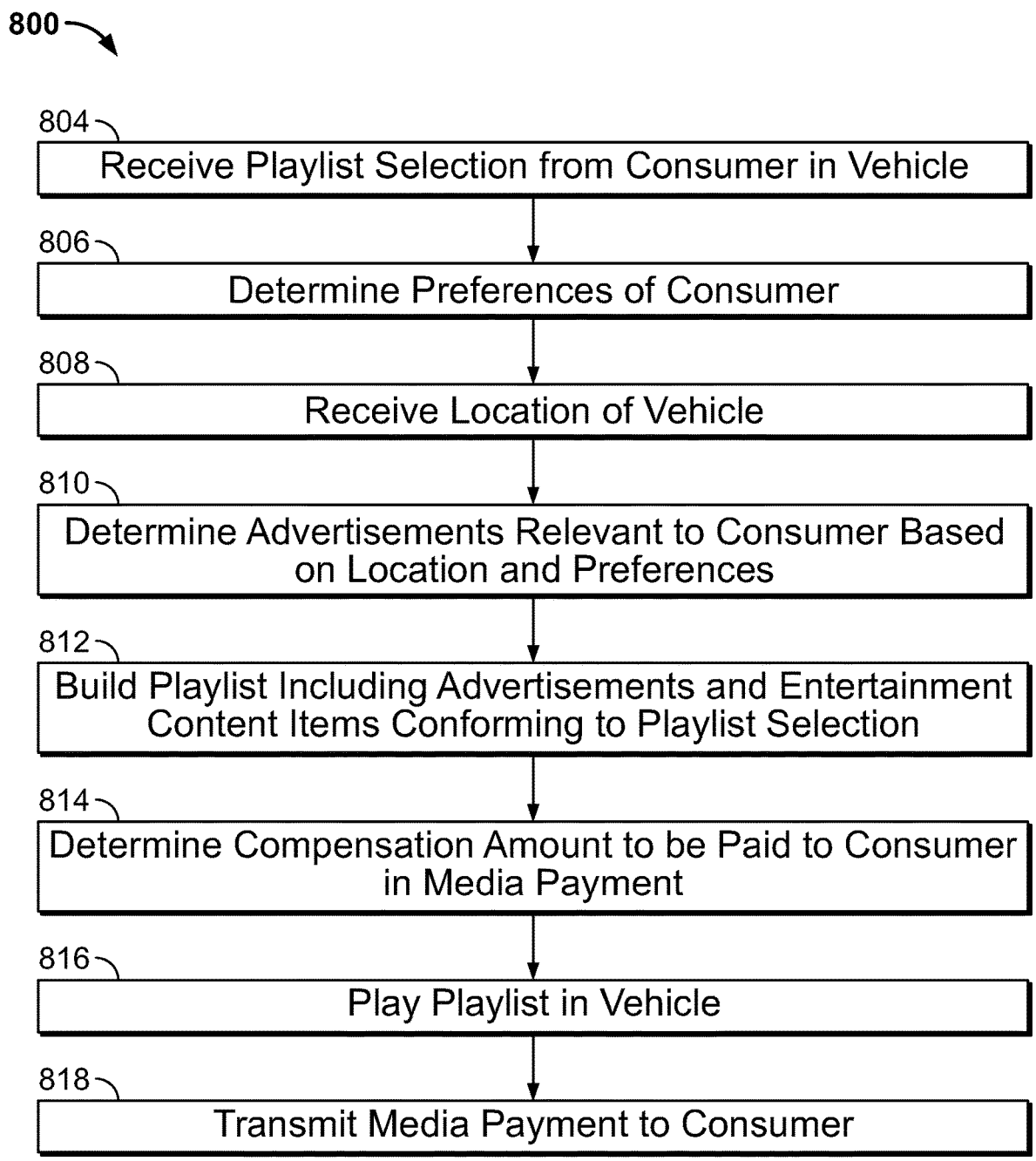
FIG. 8 shows a flowchart of a method of negotiating a media payment performed by the digital device of FIG. 1.

FIG. 8 shows a flowchart 800 of a method of negotiating a media payment paid to a consumer traveling in a vehicle. In some embodiments, the method is performed by the digital device 102 of FIGS. 1-2.

At operation 802, a playlist selection is received from a consumer traveling in a vehicle. The consumer may be a driver or a passenger in the vehicle. The vehicle may be an automobile, a motorcycle, a bus, a truck, a train, or other motorized means of transportation. The playlist selection defines the ratio of advertisements to entertainment content items that are included in the playlist and the compensation amount to be paid to the consumer. A high paid playlist has a greater amount of advertisements than entertainment and pays the most to the consumer in a media payment. A medium paid playlist has a balanced mixture of advertisements and entertainment and provides a moderate amount of compensation to the consumer. A low paid playlist has a greater amount of entertainment content than advertisements and pays the least to the consumer in a media payment. The playlists are described in further detail with respect to FIG. 7.

At operation 804, one or more preferences of the consumer are determined. The consumer's preferences can be determined by user input, user feedback, and/or analyzing past consumer behavior. The consumer's preferences can include one or more of preferred genres of music, preferred artists or authors, preferred genres of audiobooks or podcasts, preferred types of advertisements, preferred types of entertainment content, and preferred types of advertisement content. The consumer can provide input or feedback through a user interface by touch screen, voice command, or physical controls.

At operation 806, a location of the vehicle in which the consumer is travelling is determined. A location determining device 206 is utilized to determine the vehicle's position. The location determining device 206 may communicate with one or more satellites through GPS to determine the location. Other methods of determining the vehicle's location are possible, such as Wi-Fi.

At operation 808, one or more advertisements are determined that are relevant to the consumer based on the location of the vehicle and the preferences of the consumer. Advertisements are sponsored media content for which the consumer is paid to listen. Advertisements include one or more of commercials, sponsored songs, sponsored book excerpts, sponsored videos, sponsored podcasts, and other promotional media items. In embodiments where the consumer is traveling along a particular route, advertisements are selected based on proximity to the consumer's route. Advertisements are considered to be on the route of the vehicle in which the consumer is traveling based on the GPS location of the vehicle. Advertisements are considered to be local based on a history of routes and destinations that the consumer has traveled previously. Advertisements are considered to be regional based on where the consumer spends most of their time.

At operation 810, one or more entertainment content items are determined that are aligned with the preferences of the consumer. Entertainment content items are non-sponsored media content for which the consumer is not paid to listen. Entertainment content includes one or more of music, podcasts, audiobooks, videos, and other non-promotional media items. In some embodiments, the consumer pays to listen to non-sponsored entertainment media content. In such embodiments, the consumer may pay an entertainment rate to listen to entertainment media content.

At operation 812, a playlist is built that includes the one or more selected advertisements and one or more selected entertainment content items that conform to the playlist selection. If a high paid playlist was selected, more advertisements will be included. If a low paid playlist was selected, more entertainment will be included. The playlist may be built to last the duration of the consumer's route or may be continually updated.

Figure 9:
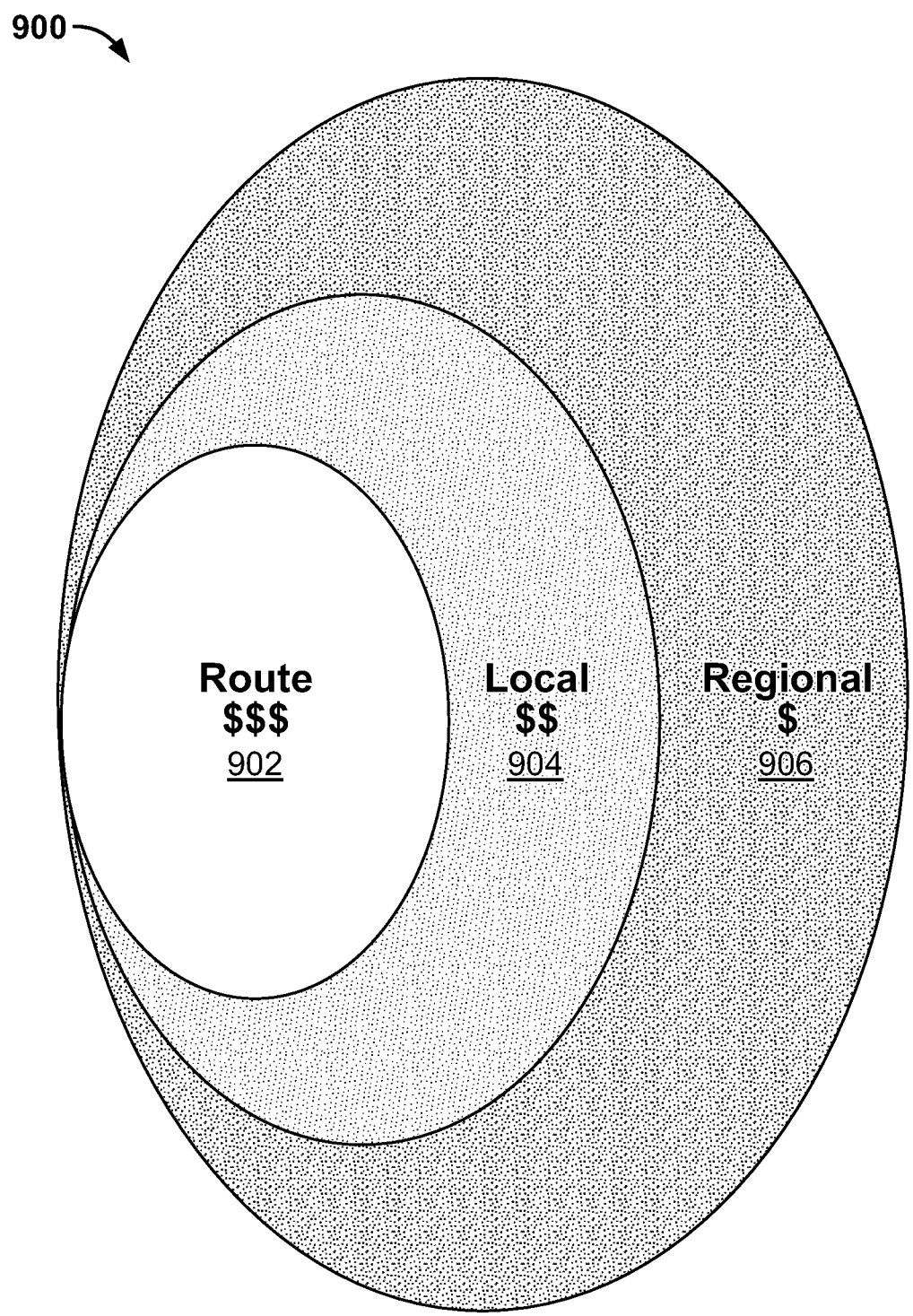
FIG. 9 illustrates an example diagram of advertisement rates based on geography.

At operation 814, a compensation amount is determined to be paid to the consumer in a media payment. The media payment is determined based on one or more of an amount of advertisements included in the playlist, and a level of regional relevance of the advertisements to the consumer's location. As was described above, playlists including more advertisements pay more to the consumer in media payments. Additionally, advertisements that are of greater geographic relevance to the consumer will earn the consumer a greater a media payment per advertisement. FIG. 9 further illustrates how geographic areas are used to determine media payments.

Media payment amounts are also influenced by the amount that advertisers bid for the placement of advertisements. Advertisers may bid over one another to gain more relevant or more frequent ad placement in consumer's playlists. In some embodiments, the playlists are updated to include the highest paying advertisement content available to the consumer at the time.

At operation 816, the playlist is played in the vehicle. In some embodiments, the playlist is dynamically updated in response to changes in the vehicle's location and updates to the consumer's preferences. For example, as the vehicle travels, it passes through different geographical areas. Advertisements that are local to that area may be incorporated into the playlist as the consumer travels through that area. The playlist may also be updated in response to feedback from the consumer. For example, the consumer may "like" or "dislike" particular advertisements or entertainment content, which influences the remaining advertisement or entertainment media content included in the remainder of the playlist to incorporate those preferences of the consumer. In some embodiments, the consumer may detour to travel closer to advertisers in order to earn a higher payment rate for listening to advertisements. The playlist may be played directly from a media-playback device or through a vehicle media system.

At operation 818, the media payment is transmitted to the consumer. In some embodiments, the media payment is deposited and stored in an online account for the consumer. The online account may be an existing financial account associated with the consumer. Alternatively, the online account may be an account specifically designated for media payments. In some embodiments, a fee is required to listen to some or all entertainment content items. In such embodiments, the fee may be deducted from the consumer's media payments stored in the online account associated with the consumer when the entertainment content is played.

FIG. 9 illustrates a diagram 900 of advertisement rates based on geography. Generally, the more geographically specific the advertisement is to the consumer's location during travel, the higher rate of payment will be to the consumer for listening to the advertisement. The geography in which the consumer is traveling can be broken into three zones: route 902, local 904, and regional 906.

The route 902 is the zones proximate to the route along which a consumer is traveling. The route rate indicates that an advertiser is willing to pay the consumer the most in a media payment because the zone proximate to the consumer's route is the most relevant to the consumer's location. For example, the consumer may pass directly by a store or restaurant which is advertising while the consumer is traveling along a particular route.

The local 904 area is a zone around frequent destinations of the consumer's travels. In some embodiments, the local 904 area is determined by the consumer's past trips. The local area 904 is near enough to the consumer's route that the consumer could travel to the location of advertisers with a short detour. Advertisers are willing to pay a moderate amount in a media payment because the consumer spends more time around those areas. For example, a consumer may travel past particular businesses on a regular basis, even if the consumer is not currently traveling past those businesses at the current time. Therefore, those businesses are willing to pay a local rate for the consumer to listen to their advertisements.

The regional 906 area is the broader vicinity of the consumer. In some embodiments, the regional 906 area is determined by the consumer's past trips. Advertisers will be willing to pay a lower regional rate because the advertisements are less likely to be of interest to the consumer based on where the consumer travels. For example, the advertiser that is willing to pay a regional rate may be within the same city as the consumer, but is not in a part of the city where the consumer typically travels.

Figure 10:
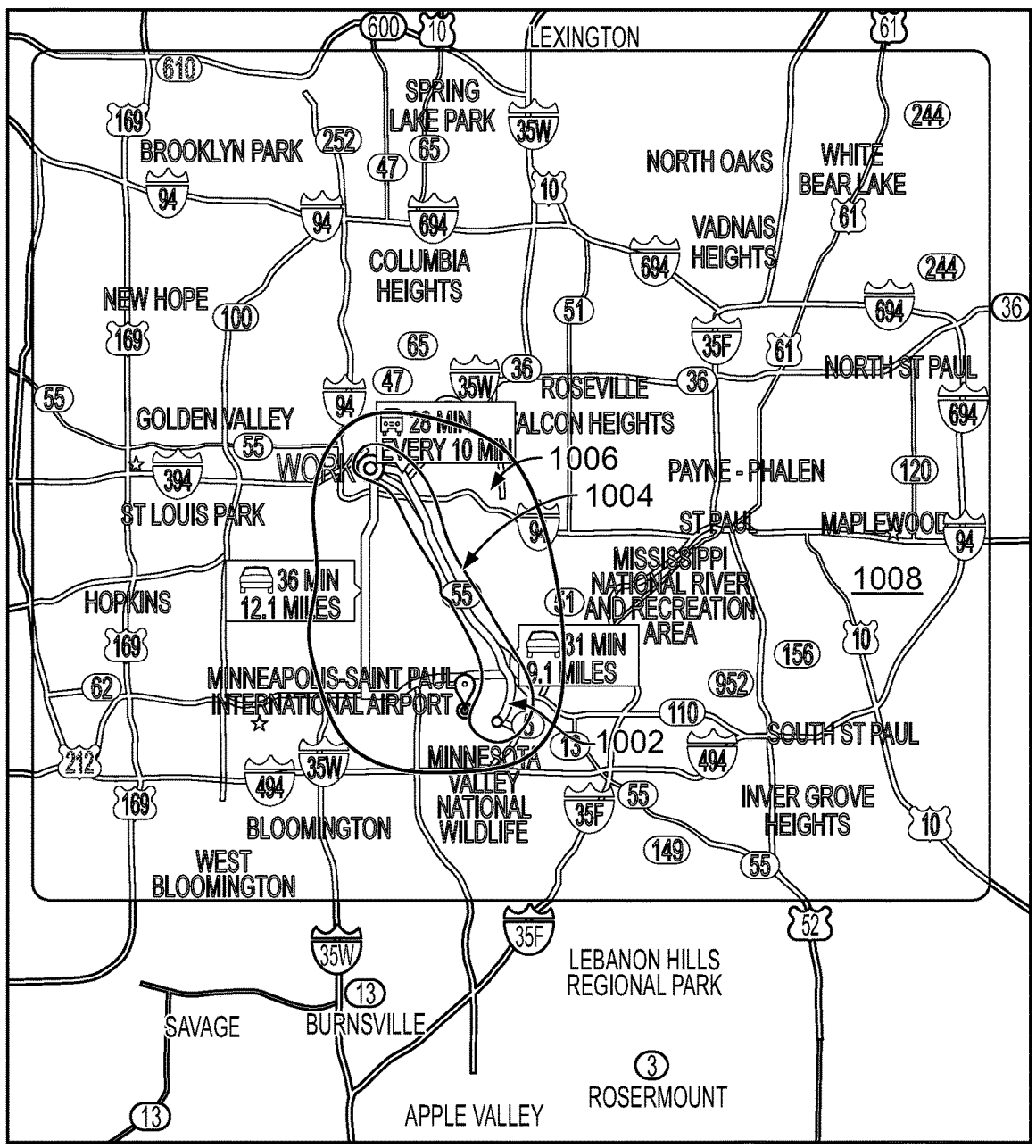
FIG. 10 illustrates an example map of a geographic region for a navigation route.

FIG. 10 illustrates an example map 1000 of different geographic regions for a particular navigation route 1002. The navigation route 1002 shows the planned route of the consumer's travel (here, from downtown Minneapolis to the Minneapolis-St. Paul International Airport). The geographic area directly surrounding the navigation route 1002 is the route area 1004. This area provides the highest media payments for advertisements relevant to the immediate area around the navigation route 1002. The geographic area that generally surrounds the route area 1004 is the local area 1006. The local area 1006 provides moderate media payments for advertisements relevant to that particular part of the city because the consumer spends more time in that area. The much larger regional area 1008 encompasses most of the metropolitan area. Media payments for advertisements relevant to the regional area 1008 pay the least. In this example, there may be many advertisements associated with the Mall of America. By re-routing to pass near the Mall of America, the consumer may receive higher media payments for listening to more advertisements from within the route area.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method, implemented on an electronic computing device, of negotiating a media payment paid to a consumer traveling in a vehicle, the method comprising:
   on the electronic computing device positioned in the vehicle, receiving a playlist selection from the consumer traveling in the vehicle;
   determining one or more preferences of the consumer;

receiving a location of the vehicle using a global positioning satellite device and a route as defined by a navigation device;

determining one or more advertisements relevant to the consumer based on the location of the vehicle and the preferences of the consumer;

determining one or more entertainment content items that are aligned with the preferences of the consumer;

building a playlist including the one or more advertisements and one or more entertainment content items that conform to the playlist selection;

determining a compensation amount to be paid to the consumer in the media payment based on:

an amount of advertisements included in the playlist, and a level of regional relevance of the advertisements to the consumer's location, the greater the level of regional relevance, the greater the compensation amount to be paid to the consumer;

playing the playlist in the vehicle; and transmitting the media payment to the consumer.

2. The method of claim 1, wherein the playlist selection defines a ratio of advertisements to entertainment content items that are included in the playlist and the compensation amount to be paid to the consumer.

3. The method of claim 2, wherein the playlist is one of a high paid playlist having a greater amount of advertisements, a medium paid playlist having a balanced mixture of advertisements and entertainment content, and a low paid playlist having a greater amount of entertainment content.

4. The method of claim 1, wherein the preferences are determined by one or more of consumer input, consumer feedback, and analyzing past behavior of the consumer.

5. The method of claim 1, wherein the advertisements comprise sponsored media content for which the consumer is paid to listen and includes one or more of commercials, sponsored songs, sponsored book excerpts, sponsored videos, and other promotional media.

6. The method of claim 1, wherein entertainment content items comprise non-sponsored media content for which the consumer is not paid to listen and includes one or more of music, podcasts, audiobooks, and other entertainment.

7. The method of claim 6, wherein the consumer pays to listen to non-sponsored media content.

8. The method of claim 1, wherein the playlist is dynamically updated in response to changes in the vehicle's location and updates to the consumer's preferences.

9. The method of claim 1, wherein the media payment is stored in an online account for the consumer.

10. The method of claim 9, wherein the consumer pays to hear entertainment media content with funds in the online account.

11. The method of claim 1, further comprising receiving bids from one or more advertisers for placement of the advertisements and selecting the advertisements with highest media payments.

12. One or more computer-readable media having computer-executable instructions embodied thereon that, when executed by a digital device, cause the digital device to:

receive at a virtual personal assistant, preferences of a consumer traveling in a vehicle;

receive at the virtual personal assistant, a playlist type selection from the consumer;

receive at a media consumption payment negotiation engine, a location and route of the vehicle;

determine by the media consumption payment negotiation engine, a plurality of advertisements relevant to the consumer based on the location and route of the vehicle and the preferences of the consumer;

receive bids at a financial transaction processor, from one or more advertisers for placing the plurality of advertisements in a playlist based on geographic relevance;

determine by the financial transaction processor, a media payment amount to be paid to the consumer from an advertiser for listening to each of the plurality of advertisements, the media payment amount being based, at least in part, on the location and the route of the vehicle, the greater the level of regional relevance, the greater the media payment amount to be paid to the consumer;

determine by the media consumption payment negotiation engine, a plurality of entertainment content items that align with the preferences of the consumer;

build by a media playback application, the playlist comprising at least one advertisement and at least one entertainment content item that conform with the playlist type selection;

play the playlist in the vehicle through a device output; and submit a media payment to the consumer through the financial transaction processor.

13. The computer-readable media of claim 12, wherein the preferences comprise one or more of preferred genres of music, preferred genres of audiobooks, preferred genres of podcasts, preferred musical artists, preferred audiobook authors, preferred types of entertainment content, preferred types of advertisements, and preferred advertisement content.

14. The computer-readable media of claim 12, wherein the playlist type selection defines a media payment rate and a ratio of advertisements to entertainment in the playlist, wherein greater amounts of advertisements result in higher media payment rates.

15. The computer-readable media of claim 12, wherein the playlist is configured to include highest paying advertisements available based on the consumer's location.

16. The computer-readable media of claim 15, wherein the advertiser can outbid other advertisements by offering higher media payments to the consumer.

17. The computer-readable media of claim 12, wherein a media payment rate is determined by geographic relevance to the consumer and the advertisements are categorized by a regional rate paying the least to the consumer, a local rate paying a moderate amount to the consumer, and a route rate paying the most to the consumer.

18. The computer-readable media of claim 12, wherein the computer-executable instructions further cause the digital device to determine by the financial transaction processor, an amount to be charged to the consumer for listening to one or more of the a plurality of entertainment content items.

19. A system for building customized playlists and rewarding consumers for listening to advertisements, the system comprising:

a remote server comprising:

a virtual personal assistant processor;

a financial transaction processor for determining payments to be sent to a consumer based on advertisements the consumer has listened to, wherein the payments are determined by a route rate, a local rate, or a regional rate depending on a regional relevance of the advertisements to the consumer's location and route, the greater the level of regional relevance, the greater the compensation amount to be paid to the consumer; and a media delivery engine for accessing advertisement media content and entertainment media content and communicating the content to a virtual personal assistant.

20. The system of claim 19, further comprising a digital device comprising:

a virtual personal assistant for interacting with the consumer traveling in a vehicle;

a media consumption payment negotiation engine for negotiating media payments to be paid to the consumer for listening to advertisements;

a location-determining device for determining the location of the vehicle;

an input for receiving commands from the consumer; and an output for communicating with the consumer and playing media.

* * * * *

UNITED STATES PATENT AND TRADEMARK OFFICE
CERTIFICATE OF CORRECTION

| | | |
|---|---|---|
| PATENT NO. | : 10,692,109 B1 | Page 1 of 1 |
| APPLICATION NO. | : 15/425323 | |
| DATED | : June 23, 2020 | |
| INVENTOR(S) | : H. Brock Kolls | |

It is certified that error appears in the above-identified patent and that said Letters Patent is hereby corrected as shown below:

In the Claims

Column 12, Line 55: In Claim 18, delete "the a" and insert --the--

Signed and Sealed this
Eighth Day of December, 2020

Andrei Iancu
*Director of the United States Patent and Trademark Office*